United States Patent [19]

Brown et al.

[11] 4,035,925
[45] July 19, 1977

[54] SYSTEM FOR TREATING PARTICULATE MATERIAL WITH GASEOUS MEDIA

[75] Inventors: George E. Brown, El Cerrito; Daniel F. Farkas, Piedmont, both of Calif.

[73] Assignee: The United States of America as represented by the Secretary of Agriculture, Washington, D.C.

[21] Appl. No.: 625,721

[22] Filed: Oct. 24, 1975

Related U.S. Application Data

[63] Continuation of Ser. No. 304,878, Nov. 8, 1972, abandoned.

[51] Int. Cl.² ............................................. F26B 5/08
[52] U.S. Cl. ............................................. 34/8; 34/34; 34/135
[58] Field of Search .................. 34/8, 12, 133, 135, 34/136, 139, 34, 14; 432/58; 210/68, 152

[56] References Cited

U.S. PATENT DOCUMENTS

| 2,222,139 | 11/1940 | Clark | 34/133 |
| 2,880,524 | 4/1959 | Hiller et al. | 34/102 |
| 3,500,552 | 3/1970 | Farkas et al. | 34/8 |
| 3,673,825 | 7/1972 | Schuierer | 34/133 |

*Primary Examiner*—John J. Camby
*Assistant Examiner*—Larry I. Schwartz
*Attorney, Agent, or Firm*—M. Howard Silverstein; David G. McConnell; Theodore J. Leitereg

[57] ABSTRACT

Method and apparatus for treating particles of food or other substances with a gas, e.g., hot air, to effect blanching, dehydration, puffing, or the like. Feature of the invention is a system wherein the particles are contained in a perforated cylinder which is rotated at a speed sufficient to produce a centrifugal acceleration of at least one g, while a unidirectional flow of gas is applied to the cylinder perpendicular to its axis of rotation.

3 Claims, 5 Drawing Figures

SYSTEM FOR TREATING PARTICULATE MATERIAL WITH GASEOUS MEDIA

This is a continuation of our copending application Ser. No. 304,878, filed Nov. 8, 1972, now abandoned.

A non-exclusive, irrevocable, royalty-free license in the invention herein described, throughout the world for all purposes of the U.S. Government, with the power to grant sublicenses for such purposes, is hereby granted to the Government of the United States of America.

DESCRIPTION OF THE INVENTION

This invention relates to and has among its objects the provision of novel method and apparatus for treating particulate solid materials with gaseous media. The treatment effectuated in accordance with the invention may be, for example, blanching, dehydration, puffing, cooking, freezing, smoking, or combinations of such treatments, as is determined by the composition and/or physical condition of the gaseous material under treatment. Further objects of the invention will be evident from the following description wherein parts and percentages are by weight unless otherwise specified.

Figure 1:
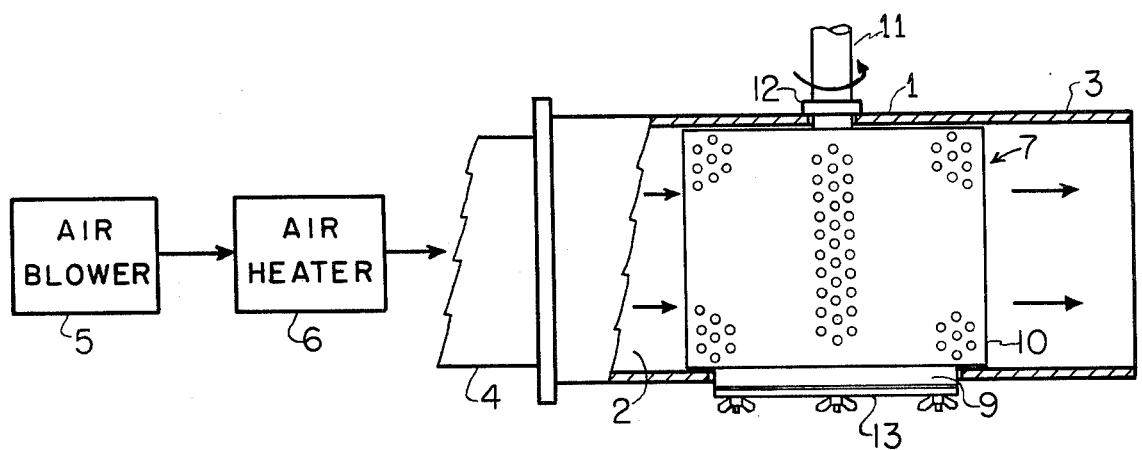
FIG. 1 is a plan view, partly in cross-section, of one modification of the apparatus of the invention.

In the following description, application of the invention for the dehydration of foods is emphasized. This is by way of illustration and not limitation. In its broad ambit the invention is applicable to particulate solids of all kinds, and is of special utility in the treatment of thermo-sensitive materials, such as foods. Also, the invention is not limited to dehydration but may be employed in any operation where particulate solids are treated with a gaseous medium.

Daniel F. Farkas et al in U.S. Pat. No. 3,500,552 (hereinafter referred to as 3,500,552), disclose a system for dehydrating potato dice, carrot dice, and other particulate material. It involves blowing hot air through a bed of material while applying centrifugal force to the bed to resist lifting action of the air stream. In this way, faster and more uniform dehydration is obtained. This results from the fact that high air velocities can be used without blowing material out of the bed. The air is applied to the material contained in a rotating basket with a perforated cylindrical wall and solid back. Since this basket is immersed in a hot air plenum chamber, the said air is applied radially, that is, from all points about the periphery of the cylindrical wall toward the center of the basket. Unfortunately, several disadvantages accompany this design: First, since the hot air must change direction in order to enter the basket and then change direction again in order to exit through the throat, a drop in pressure occurs. In addition, since the throat of the basket is smaller in diameter than the remainder, a further drop in pressure occurs because the air must be compressed prior to exiting. Thus, extra power is necessary to compensate for the pressure drop and this means increased cost to the processor. Second, the velocity of air increases as it exists through the throat because the air is compressed. As a result, particulate material being dehydrated is swept from the chamber and lost. Finally, the basket of 3,500,552 cannot be elongated to increase its capacity. Elongation would further enhance the pressure drop, this increasing costs. In fact, the only way to increase capacity in 3,500,552 is to apply more material to the bed. However, with a thick bed of material, particles at the inside are moving at lesser linear velocity and might separate from the bed and be blown out of the system.

A primary object of the invention is the provision of apparatus and method by which the foregoing problems are obviated. The present invention makes it possible to dry larger amounts of materials with lower power consumption. At the same time all the advantages of 3,500,522 are either retained or enhanced.

In accordance with the present invention, the material to be treated is contained in a rotating perforated cylinder, and a primary feature of the invention is that air, or other gas, is applied to the cylinder in one direction, namely, perpendicular to the axis of rotation. It should be noted that in 3,500,552 the air is applied radially, namely, from all points about the periphery of the basket toward the center thereof.

More particularly, the invention envisages a system as follows: The particulate material to be treated, e.g., dried, is placed in a perforated cylinder. The cylinder is rotated and concomitantly a unidirectional current of gas, e.g., hot air, is applied perpendicularly to the axis of rotation of the cylinder, and thus forced through the material in the cylinder. In general, the rotational forces maintain the particles in the form of a bed, and oppose the air stream which tends to separate them from the bed. Since the air passes through the cylinder without change of direction and without compression, little pressure drop is experienced. In addition, to apply more material to the system at any one time, the cylinder need merely be alongated. As a result, power costs are reduced, and at the same time capacity can be increased.

Effective operation of the system requires correlation of the speed of rotation of the cylinder and the velocity of the gas stream. Basically, the speed of rotation should be at least that required to develop a centrifugal acceleration of one g. This is necessary so that the material will be distributed about the perforated wall of the cylinder rather than slumping to the base of the cylinder as with conventional driers of the rotary kiln type. Moreover, the speed of rotation must be sufficiently above the said minimum level so as to resist the lifting action of the air stream.

The centrifugal acceleration acting on the material can be readily calculated from the formula $$F = 0.0000142 \, n^2 D$$

wherein:

$F$ is the centrifugal acceleration, in multiples of gravity (g).

$n$ is the speed of rotation of the cylinder, in RPM.

$D$ is the diameter of the cylinder, in inches.

As for the velocity of the air stream it is desirable to use as high a velocity as possible to maximize both heat transfer and evaporation rates. Of course, the air velocity cannot be increased indefinitely because the particles will be blown out of the system. For effective results the two factors (speed of rotation of the cylinder and air velocity) should be so correlated that the major portion (over 50%) of the material is maintained as a static bed along the perforated wall of the cylinder. In handling particularly delicate materials (e.g., chopped chives) it is preferred that the said factors be correlated so that essentially all the material is retained as a continuous bed. Best results are obtained, however, when the factors are so adjusted that about 50–75% of the material is retained as a continuous bed and the remainder is disposed as a dispersed or fluidized mass in and about the upstream portion of the perforated wall of the cylinder. Under such conditions especially high efficiency (e.g., high rate of dehydration) is achieved and such conditions are thus preferred in the treatment of most commodities, for example, potato dice, carrot dice, diced chicken meat, chopped green beans, etc.

DETAILED DESCRIPTION OF THE INVENTION

Figure 2:
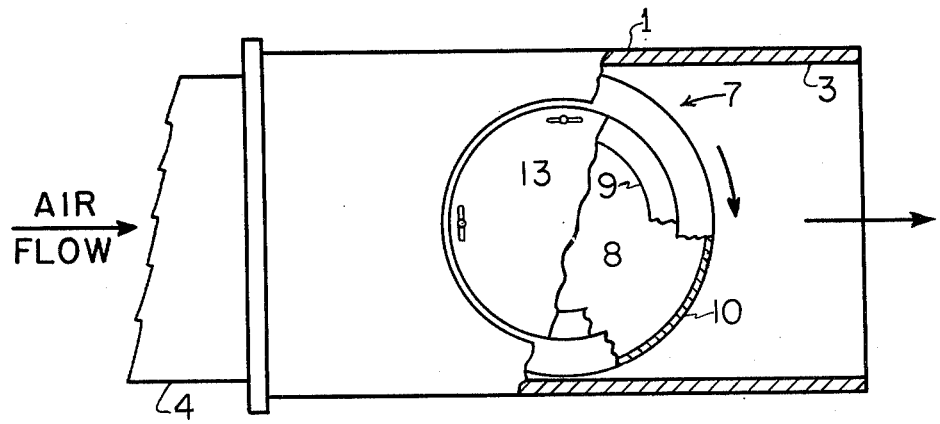
FIG. 2 is a side view of a portion of the embodiment shown in FIG. 1, parts being broken away to illustrate internal construction.

Reference is now made to FIGS. 1 and 2 which depict one embodiment of the apparatus of the invention.

Reference numeral 1 designates a housing which includes plenum chamber 2 and exit duct 3. Plenum chamber 2 is connected to inlet conduit 4, which in turn is in communication with blower 5 and heater 6. In operation, air is forced by blower 5 through heater 6 and into plenum 2, whereby this chamber is kept full of hot air under pressure higher than atmospheric.

Mounted within housing 1 is a rotatable drum or cylinder, generally designated as 7, which serves to contain the material under dehydration. Cylinder 7 includes an imperforate end member 8, a throat 9, and a cylindrical wall 10, the last being of screening or perforated metal. The openings in wall 10 are so selected that the particles of material are retained in cylinder 7, whereas hot air (from plenum 2) can pass therethrough.

For rotation in the indicated direction, cylinder 7 is keyed to shaft 11 which is supported by bearing 12. Shaft 11 is rotated by a variable speed motor (not illustrated), or the like.

For feeding material into cylinder 7 and for removing dried product therefrom, there is provided a removable door 13, preferably including a port of glass or other transparent substance so that the state of the material in cylinder 7 can be observed during operation.

It is evident from FIGS. 1 and 2 that the hot air stream provided by blower 5 and heater 6 passes unidirectionally through cylinder 7 and perpendicular to the axis thereof.

In making a run with the device of FIGS. 1 and 2, door 13 is removed, the material to be dehydrated is placed in cylinder 7, and the door put in place. Cylinder 7 is rotated and hot air is forced through it by setting blower 5 and heater 6 into operation. During the drying cycle, the speed of rotation of cylinder 7 and the velocity of the air stream therethrough are so correlated as hereinabove explained.

Figure 3:
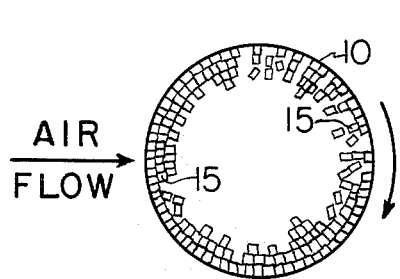
FIGS. 3 and 4 are schematic diagrams illustrating the action which takes place within the device of the invention.
Figure 4:
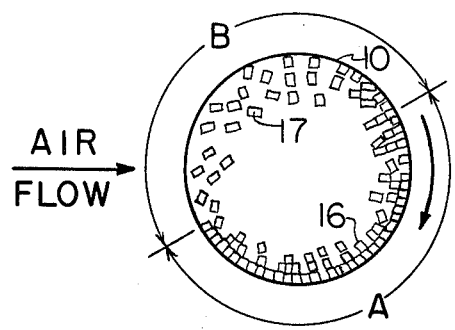

FIGS. 3 and 4 depict two modes in which the system can be operated. In FIG. 3 is shown the mode wherein speed of rotation and air velocity are so correlated that the material is maintained as a static (or packed) bed of particles 15. FIG. 4 illustrates the preferred mode of operation wherein the air velocity is increased or rotational speed decreased so that part of material (particles 16 in section A) is in the form of a static bed whereas the remainder (particles 17 in section B) is in a dispersed or fluidized state. It is to be noted that fluidized particles 17 are mainly in the upstream and upper quadrants of the cylinder. The mode of operation schematically shown in FIG. 4 is preferred because higher rates of evaporation of moisture are attained. Referring to FIG. 4, one can see that as the particles enter the upstream quadrant, the force of the air stream overcomes the opposing centrifugal force. As a consequence, the bed of material is attenuated into a disperse mass. Then as the particle travels further away from the upstream quadrant they gradually are drawn back into a static bed by centrifugal force. Accordingly, in each revolution the particles become separated into a loose mass in which the individual particles tumble about in different directions. As a result, hot air can contact the surfaces of individual particles more readily, thus increasing the rate of moisture evaporation, making the dehydration more uniform, and allowing the use of lower air temperatures.

During operation of the process, adjustment of speed of rotation or air velocity is usually required to maintain the particles in the selected mode. For example, as the moisture content of the particles decreases their density also decreases so that conditions need to be adjusted in order that particles in the upstream quadrant of the cylinder are not ejected completely out of the bed to the opposite quadrant of the cylinder. The maintenance of proper conditions is readily accomplished where door 13 is provided with a glass port so that the action within the cylinder can be observed and rotational speed and air velocity adjusted as necessary.

After the material in cylinder 7 has been dehydrated to the desired extent the flow of air is cut off and the rotation of the cylinder discontinued. Door 13 is opened and the product removed from the cylinder.

Figure 5:
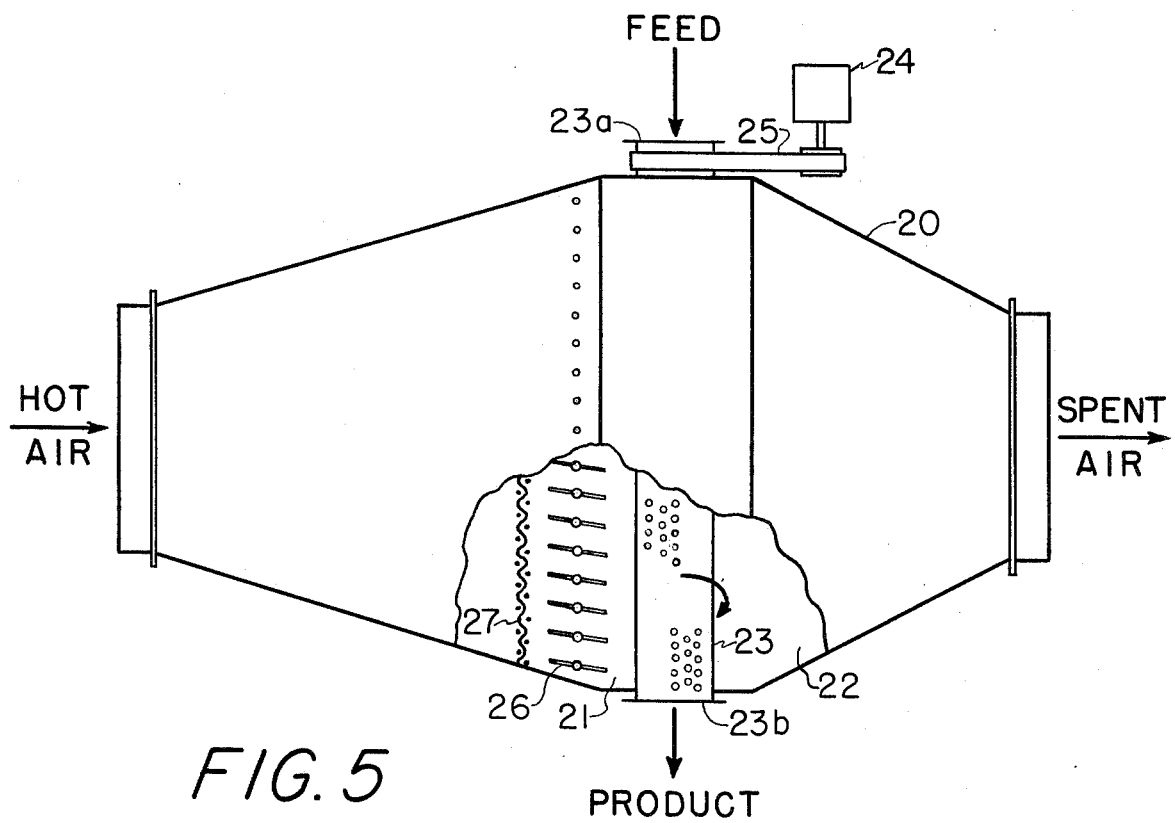
FIG. 5 is plan view of a modification of the device of the invention which is adapted for continuous operation.

FIG. 5 in the annexed drawing illustrates a modification of the invention particularly adapted for continuous operation. This apparatus includes housing 20 which is subdivided into a plenum chamber 21 and exit duct 22. Hot air is fed into plenum 21 just as in the case of the device of FIGS. 1 and 2. Mounted for rotation within housing 20 is a perforated cylinder 23 which is open at both ends. Rotation is imparted to cylinder 23 by variable speed motor 24 and belt 25.

During operation, material to be treated is continuously fed into one end of cylinder 23, designated 23a, by a conventional vibratory feeder, or the like, (not illustrated). This dried product is continuously discharged at the opposite end, designated 23b.

The air stream passing through housing 21 flows primarily in one direction, that perpendicular to the axis of rotation of cylinder 23 just as in the case of the device of FIGS. 1 and 2. Also, the material is maintained in cylinder 23 in the same condition as previously explained. To enable the material to progress axially along the cylinder--that is, in the direction 23a to 23b--there are provided a row of adjustable louvers 26. These louvers provide the air stream with a small sideward deflection so that the particles gradually move from the feed-end of cylinder 23 to the exit end thereof. By adjusting the tilt of the louvers, the sojourn time of the particles can readily be controlled. A screen 27 is preferably provided at the entrance to plenum chamber 21 to assist in providing a uniform flow of air over the cross-sectional area of the plenum.

Hereinabove it has been explained that louvers 26 are provided to deflect the air stream to cause the particles to progress from the feed end to the discharge end of cylinder 23. Instead of providing these louvers, an alternate plan to achieve the same result involves tilting cylinder 23 a small amount, about ½ to 1 degree, from the horizontal with, of course, the discharge end 23b being lower than feed end 23a.

As mentioned earlier in the present invention, the advantages of 3,500,552 are either retained or enhanced. Those that are retained are compactness of the apparatus for a given throughput, and ability to handle low-density materials such as feathers, bulk wool or cotton and other fibrous materials. In addition, the instant invention provides a faster rate of evaporation and more uniform dehydration, not only of individual particles but also of portions of individual particles. Also, one can employ lower temperatures than those used in 3,500,552 whereby the vital attributes of the products, such as color, flavor, odor, etc., are preserved to a greater degree.

As noted herein, the invention may be employed for the dehydration of all kinds of materials in particulate form. Typical examples of such materials are peas; beans; grains; berries; grapes; minced or diced fruits, vegetables, or meats, for instance, diced apples, diced carrots, diced chicken flesh, minced onions, chopped watercress; granulated, powdery, or crystalline materials such as potato granules, sugar, starch, flour, etc. Other examples are fibrous materials such as feathers, bulk wool, cotton linters, staple rayon fibers, and the like. The invention may also be applied to biological materials such as botanicals, yeast and other microbial preparations, bone, organs, etc. Other examples are oil seeds, and residues from oil extraction such as the meals remaining from the extraction of cotton seed, safflower seed, etc.

Although the invention finds its greatest field of utility in dehydration, it may be employed to effectuate diverse types of operations which involve contacting particulate solid material with a gaseous agent. In all such applications, the invention provides an intimate contacting of the particulate material with the gaseous agent as herein described, with the net result that the desired treatment is carried out rapidly, uniformly, and with apparatus of small size relative to its capacity. Typical applications of the invention, in addition to those noted above, are provided below by way of illustration but not limitation.

The invention can be used for the puffing of various food products. In these applications the air stream is maintained at a temperature well above those conventionally used for dehydration so that the evaporation takes place so rapidly as to expand or puff the material under treatment. Depending on the type of product and the degree of puff desired, air temperatures of 250° to 1000° F. may be used. Typical of the materials which may be puffed are: potatoes, carrots, apples, sweet potatoes, or other fruits or vegetables in particulate form such as dice, slices, chips or the like, or in whole form with smaller products such as peas, beans, lentils, wheat, barley, rice, corn, milo, etc. Other products which can be puffed are processed grains, as for example: parboiled rice, bulgur in whole or cracked form, and peeled wheat products in raw or pre-cooked forms such as those described in U.S. Pat. No. 3,264,113 and 3,358,723.

The invention can also be used for the roasting of all kinds of food products, for example, coffee beans, soy beans and other legume seeds, cereal coffee substitutes, etc.

The invention can also be used for blanching or cooking all kinds of particulate foods. In such applications, steam or water sprays may be introduced into plenum 2 or plenum 21 so that the gas stream contacting the food will effect the desired blanching or cooking effect without concomitant dehydration, or, with a desired degree of dehydration by suitable regulation of the amount of moisture fed into the plenum. Also, during the use of the invention in such applications as dehydration, puffing, blanching, cooking, etc. the gas stream can be used as a convenient means for contacting the food with a desired agent. Thus, one may introduce into the plenum such agents as wood smoke to provide the products with a smoky flavor, or preservative agents such as sulphur dioxide to prevent darkening of the products.

The invention can also be used for cooling, freezing, or pre-freezing particulate foods. In such applications it will be obvious that the heater would be replaced by a refrigerating unit so that the gas stream entering the plenum is at the appropriate low temperature required for treating the material.

EXAMPLES

The invention is further demonstrated by the following illustrative examples. The experiments reported in these examples were carried out in a device as shown in FIGS. 1 and 2 wherein cylinder 7 was 6 inches in diameter and 4 inches in length. Cylindrical wall 10 was made of 18-gauge stainless steel with 0.188 in. round perforations on ¼ in. staggered centers (50% open).

EXAMPLE 1

Dehydration of Diced Carrots

The starting material was ⅜ in. diced carrots containing 85.8% moisture. The diced carrots (0.64 lbs.) were loaded into the cylinder, which was then rotated at 110 rpm. Air at 160° F. was supplied into the plenum at a rate of 124 cu. ft. per min. (measured at standard conditions). After a period of 20 min., the rotation of the cylinder was stopped, the air shut off, and the product removed. It had a weight of 0.207 lbs., representing a weight loss by evaporation of water of 67%. It was observed that the diced form of the starting material was retained in the product, although it was shrunken.

EXAMPLE 2

Dehydration of Diced Apples

The starting material was 5/16-in. diced apples containing 83.5% moisture. A wire mesh screen was placed on the inside of the cylinder surface to prevent sticking. The diced apples (0.391 lbs.) were loaded into the cylinder, which was then rotated at 250 rpm. Air at 260° F. was supplied into the chamber at the rate of 136 cu. ft. per min. (measured at standard conditions), but was supplied intermittently, the air being on 20 seconds, then shut off 20 seconds, etc. After a period of 15 minutes, the rotation of the cylinder was stopped, the air shut off, and the product removed. It had a weight of 0.112 lbs., representing a weight loss by evaporation of water of 71%.

It was observed that the diced form of the starting material was retained in the product and that the original color of the pieces was retained, even in their centers.

EXAMPLE 3

Dehydration and Puffing of Potato Cubes

The starting material was ⅜-in. diced potatoes containing 79.8% moisture. The diced potatoes (0.59 lbs.)

were loaded into the cylinder, which was then rotated at 280 rpm. Air at 260° F. was supplied into the chamber at the rate of 136 cu. ft. per min. (measured at standard conditions), but was supplied intermittently, the air being on 20 seconds, then shut off 20 seconds, etc. After a period of 30 minutes, the rotation of the cylinder was stopped, the air shut off, and the product removed. It had a weight of 0.148 lbs. representing a weight loss by evaporation of water of 75%. It was observed that the product was puffed in the form of a rounded cube with a hollow center, having a density of 18.8 lb/ft$^3$. The product in the puffed form is very suitable as a snack item. It was further observed that the puffed product, if placed in boiling water, reconstituted within 5 minutes to a cooked potato dice.

EXAMPLE 4

Dehydration and Puffing of Diced Carrots

The starting material in this case was ⅜-in. diced carrots containing 87.1% moisture. The diced carrots (1.25 lbs.) were loaded into the cylinder, which was then rotated at 250 rpm. Air at 260° F. was supplied into the plenum at a rate of 136 cu. ft. per min. (measured at standard conditions) but was supplied intermittently, the air being on 20 seconds, then shut off 20 seconds, etc. After a period of 30 minutes, the rotation of the cylinder was stopped, the air shut off, and the product removed. It had a weight of 0.201 lbs., representing a weight loss by evaporation of water of 84%. It was observed that the diced form of the starting material was retained in the product, and that puffing had taken place. The product had a bulk density of 13.7 lb/ft$^3$ and rehydrated within 5 minutes in boiling water.

EXAMPLE 5

Blanching of Cut Green Beans

The starting material was green beans cut to 1-in. lengths. The cut green beans (0.11 lbs.) were loaded in the cylinder, which was then rotated at 250 rpm. Air at 260° F. was supplied into the plenum at a rate of 136 cu. ft. per min. (measured at standard conditions). After a period of 4 min., the rotation of the cylinder was stopped, the air shut off, and the product removed. It had a weight of 0.053 lbs., representing a weight loss by evaporation of water of 52 %. Peroxidase analysis showed that the enzyme activity had been reduced to 0.4% of original activity and therefore that the product was sufficiently blanched.

Having thus described our invention, we claim:

1. A process for treating particulate material with a gaseous medium, which comprises
    providing a mass of particulate material,
    rotating the mass while restrained by a perforated cylindrical surface at a speed at least that required to establish a centrifugal acceleration of 1 g, and to hold the major portion of the mass against the surface by centrifugal force, and
    forcing a single unidirectional stream of gas through the said mass, the direction of flow within said stream being everywhere normal to a unique hypothetical plane that contains the entire axis of rotation of the perforated cylindrical surface and divides the perforated cylindrical surface into as ascending half and a descending half, said unidirectional stream entering the ascending half of the perforated cylindrical surface, then in the same direction passing through the said mass, and, finally, in the same direction exiting the descending half of the perforated cylindrical surface, maintaining the velocity of said stream of gas high enough such that about 25 to 50% of the material is formed into a fluidized mass of particles in and about the ascending half of the perforated cylindrical surface and such that the particles in and about the descending half of the perforated cylindrical surface are formed into a fixed, non-fluidized mass.

2. A process for dehydrating particulate heat-sensitive material, which comprises
    providing a mass of particulate heat-sensitive material,
    rotating the mass while restrained by a perforated cylindrical surface at a speed at least that required to establish a centrifugal acceleration of 1 g, and to hold the major portion of the mass against the surface by centrifugal force, and
    forcing a single unidirectional stream of gas through the said mass, the direction of air flow within said stream being everywhere normal to a unique hypothetical plane that contains the entire axis of rotation of the perforated cylindrical surface and divides the perforated cylindrical surface into an ascending half and a descending half, said unidirectional stream entering the ascending half of the perforated cylindrical surface, then in the same direction passing through the said mass, and, finally, in the same direction exiting the descending half of the perforated cylindrical surface, maintaining the velocity of said stream of gas high enough such that about 25 to 50% of the material is formed into a fluidized mass of particles in and about the ascending half of the perforated cylindrical surface and such that the particles in and about the descending half of the perforated cylindrical surface are formed into a fixed, non-fluidized mass.

3. A process for continuously dehydrating particulate heat-sensitive material, which comprises
    continuously feeding the particulate material into a dehydration zone,
    in the dehydration zone continuously rotating the material in a container provided with a perforated cylindrical wall at a speed sufficiently high to hold at least the major portion of the material against the perforated wall by centrifugal force,
    in the dehydration zone continuously directing a single unidirectional stream of hot air through the material, the direction of air flow within said stream being everywhere normal to a unique hypothetical plane that contains the entire axis of rotation of the container and divides the perforated cylindrical wall into an ascending half and a descending half, said unidirectional stream entering the ascending half of the perforated cylindrical wall, then in the same direction passing through the material contained therein, and, finally, in the same direction exiting the descending half of the perforated cylindrical wall, maintaining the velocity of said stream of hot air high enough such that about 25 to 50 % of the material is formed into a fluidized mass of particles in and about the ascending half of the perforated cylindrical wall and such that the particles in and about the descending half of the perforated cylindrical wall are formed into a fixed, nonfluidized mass, and
    continuously discharging dehydrated product from the dehydration zone.

* * * * *